United States Patent [19]

Lewis et al.

[11] 4,056,559

[45] Nov. 1, 1977

[54] NOVEL POLYMERS OF ALKYL METHACRYLATES

[75] Inventors: Sheldon N. Lewis, Willow Grove; Richard A. Haggard, Fort Washington, both of Pa.

[73] Assignee: Rohm and Haas Company, Philadelphia, Pa.

[21] Appl. No.: 517,336

[22] Filed: Oct. 23, 1974

Related U.S. Application Data

[63] Continuation-in-part of Ser. No. 371,921, June 20, 1973, abandoned, which is a continuation-in-part of Ser. No. 137,057, April 23, 1971, abandoned.

[51] Int. Cl.$^2$ ............................................. C07C 9/54
[52] U.S. Cl. ..................... 526/212; 560/205; 560/222; 560/224; 560/221; 260/448.2 B; 260/465.9; 526/279; 526/310; 526/329.2
[58] Field of Search ................................. 260/486 R

[56] References Cited

U.S. PATENT DOCUMENTS

| | | | |
|---|---|---|---|
| 2,956,990 | 10/1960 | Fettes | 260/486 R |
| 3,317,483 | 5/1967 | Verdol | 260/486 R |
| 3,627,820 | 12/1971 | Chujo | 260/486 R |

*Primary Examiner*—Paul J. Killos
*Attorney, Agent, or Firm*—Harold L. Greenwald; William E. Lambert, III

[57] ABSTRACT

Polymers of esters of methacrylic acid having an average chain length of about 6 to about 50 mers are prepared by an anionic polymerization reaction, carried out in the presence of a chain-regulating alcohol and a catalytic amount of an alkoxide anion, in which control of the molecular weight and molecular weight distribution of the polymer are achieved by regulating the ratio of the total quantity of alcohol employed to the total monomer charge. These polymers, their hydrolysis products, and their derivatives have a wide variety of applications, including use as components in films, coatings, fibers, impregnants, adhesives, printing inks, and binders, and use as modifiers, plasticizers, melt flow improvers, and leveling agents.

18 Claims, 1 Drawing Figure

NOVEL POLYMERS OF ALKYL METHACRYLATES

CROSS-REFERENCE TO RELATED APPLICATION

This application is a continuation-in-part of our pending application U.S. Ser. No. 371,921, filed June 20, 1973, which is a continuation-in-part of our pending application U.S. Ser. No. 137,057, filed on Apr. 23, 1971, both now abandoned.

THE DISCLOSURE

This invention relates to novel homopolymers and copolymers of esters of methacrylic acid, to polymer compositions which comprise these novel polymers, to methods of making the polymers, and to uses of the polymers.

Polymers having relatively low molecular weights, often referred to as oligomers, have recently become of increasing interest, in part due to their use in adhesives, plasticizers, leveling agents, and melt-index improvers, and in formulating coating compositions having very high solids content. While various alkyds, polyesters, polyethers, polyamides, and polyurethanes having molecular weights in the range of 500 to 2500 can be conveniently prepared, suitable acylic polymers in this molecular weight range have heretofore been inaccessible. Because acrylic polymers have many extremely valuable advantages, including relatively low cost, low color, good outdoor durability, high chemical resistance, and good thermal stability, and because the various non-acrylic low molecular weight polymers with functionalities greater than two are often difficult to prepare, polymer compositions comprising low molecular weight acrylic polymers would be particularly desirable.

Attempts have been made to prepare acrylic polymers having molecular weight distributions in the range of 2550 to 10000 by free radical polymerization techniques. However, these procedures are generally unacceptable, either because high temperature or high pressures are needed to carry out the polymerization reaction, because the chain transfer agent employed in the reaction has an objectionable odor or toxicity, or because the properties of the polymer produced in the polymerization reaction are adversely affected by a high incidence of initiator or chain transfer fragments in the polymer chains. Furthermore, it is difficult to control the molecular weight distribution of polymers prepared by free radical techniques. Thus, such polymers tend to have a broad molecular weight distribution, and contain significant amounts of high molecular weight polymer, which can give unattractive properties to the polymer compositions. It has now been found that novel polymer compositions free of the undesirable properties of prior art materials can be prepared by a novel anionic polymerization technique, which allows control of the polymer chain length and of the molecular weight distribution of the polymer.

According to the invention, novel polymer compositions are provided which comprise an anionically-polymerized addition homopolymer of an alkyl ester, a dialkylaminoalkyl ester, an alkoxyalkyl ester, an aryloxyalkyl ester, an aralkoxyalkyl ester, or an alkylsilylalkyl ester of methacrylic acid, an anionically-polymerized addition copolymer of at least two of these esters, or an anionically-polymerized addition copolymer of at least one of these esters with at least one other copolymerizable monomer. In the polymer compositions of the invention, the homopolymer or copolymer has an average chain length of about 6 to about 50 mers. In one preferred embodiment, the average chain length will be about 6 to about 25 mers, and in another preferred embodiment, the average chain length will be about 8 to about 20 mers.

The polymers of the invention are characterized by having not only low molecular weight, but also very narrow molecular weight distribution. Generally, at least about 85% by weight of the molecules of the homopolymer or copolymer in the polymer compositions have chain lengths falling between $\sqrt{2\bar{n}}$ and $2\bar{n}$, where $\bar{n}$ is the average chain length of the polymer. Thus, when the average chain length of the homopolymer or copolymer is about 6 mers, at least about 85% by weight of the molecules of the homopolymer or copolymer generally have chain lengths of about 3.5 to about 12 mers, and when the average chain length of the homopolymer or copolymer is about 25 mers, at least about 85% by weight of the molecules of the homopolymer or copolymer generally have chain lengths of about 7 to about 50 mers. In a preferred embodiment of the invention, at least about 85% by weight of the molecules of the homopolymer or copolymer in the polymer compositions will have a chain length of about 4 to 40 mers. Depending upon the particular ester of methacrylic acid which is employed, and the particular comonomer which may be employed, the polymer compositions of the invention will have a molecular weight distribution (weight average molecular weight, $\bar{M}w$) in the range of about 400 to about 10,000, and preferably about 500 to about 2500. The dispersities (ratio of weight average molecular weight to number average molecular weight) of the polymer compositions of the invention are also quite low, generally being about 1.1 to about 3, preferably less than about 2, and most preferably less than about 1.5.

Figure 1:
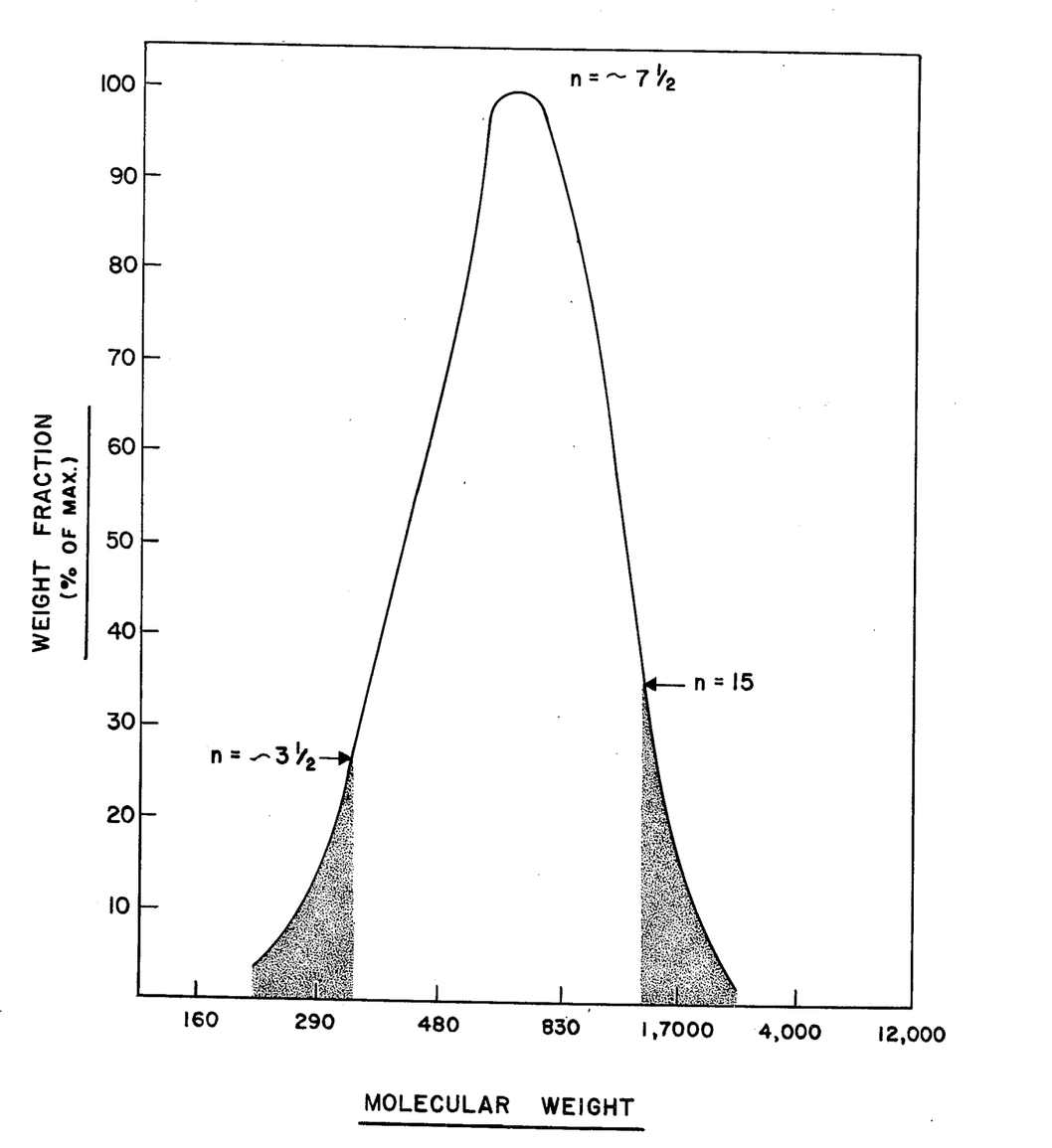

In the accompanying drawing, which will make the nature of the present invention more readily apparent, the FIGURE represents a typical chain length curve for polymers of the invention, in which the molecular weight, as determined by calibrated gel permeation chromatography, is plotted against the percentage of each molecular weight fraction relative to the maximum molecular weight fraction. The average chain length, $\bar{n}$, is then calculated by dividing the molecular weight at the distribution curve maximum by the molecular weight of the monomer. The shaded areas within the distribution curve represent the determination of the 90% distribution limits. The chain length, $n$, at each of these limits is calculated by dividing the molecular weight at these points by the molecular weight of the monomer. The FIGURE represents the chain length distribution curve for the polymer of Example 8, in which the average chain length, $\bar{n}$, is 7.5 and 90% by weight of the molecules of the polymer composition have chain lengths of about 3½ to 15.

The polymer compositions of the invention are produced by the anionic homopolymerization of an ester of methacrylic acid, or by the anionic copolymerization of an ester of methacrylic acid with at least one other alkoxide copolymerizable monomer. The anionic polymerization reaction is carried out in the presence of an alkoxide anion, which serves as a catalyst, and an alcohol, which serves as a chain-regulating agent.

In general, most of the homopolymers of the polymer compositions of the invention can be represented by the following formula:

(I)

wherein
RO represents the residue of the chain-regulating alcohol used in the polymerization reaction,
R'O represents the alcohol portion of the monomeric ester of methacrylic acid, and
$n$ is an integer of 3 to 90, preferably 4 to 40, most preferably 5 to 25, and represents the chain length of the polymer.

The copolymers of the polymer compositions of the invention can be similarly represented, in general, by the following formula:

(II)

wherein
RO and R'O are as defined above,
M represents the residue of the comonomer or comonomers, and
$n'$ and $n''$ are integers of one or more, wherein the sum of $n'$ and $n''$ is 3 to 90, preferably 4 to 40, and most preferably 5 to 25.

It should be noted that the copolymers represented by Formula II represent polymers of two or more monomers, and are random copolymers, so that Formula II is only a simplified representation of the composition of these copolymers, and does not attempt to show their physical stereochemical structure. Furthermore, it should be noted that when RO differs from R'O in Formulas I and II, scrambling of these groups by transesterification occurs to some extent during the polymerization reaction. Thus, in some of the homopolymers represented by Formula I and copolymers represented by Formula II, RO will be replaced at some positions by R'O and R'O will be replaced at some positions by RO.

A wide variety of esters of methacrylic acid can be used in preparing the homopolymers and copolymers of the invention. Mixtures of these esters can also be used. Among the suitable esters which can be used are those having the formula (III)

wherein R'' is an alkyl group, preferably having 1 to 24 carbon atoms, most preferably 1 to 18 carbon atoms; a dialkylaminoalkyl group, preferably a di($C_1$–$C_4$)alkylamino($C_2$–$C_4$)alkyl group; an alkoxyalkyl group, preferably having a total of 2 to 12 carbon atoms; an aryloxyalkyl group or aralkoxyalkyl group, preferably having 7 to 12 carbon atoms; or an aralkyl group, preferably having up to 10 carbon atoms.

In a preferred embodiment of the invention, R'', whether substituted or unsubstituted, will have a total of up to 6 carbon atoms.

Among the esters embraced by formula III are alkyl methacrylates, in which the alkyl group can have branched- or straight-chain, cyclic or acylic spatial configurations, such as methyl methacrylate, ethyl methacrylate, propyl and cyclopropyl methacrylates, butyl and cyclobutyl methacrylates, pentyl and cyclopentyl methacrylates, hexyl and cyclohexyl methacrylates, heptyl and cycloheptyl methacrylates, octyl methacrylates, nonyl methacrylates, decyl methacrylates, undecyl methacrylates, lauryl methacrylates, myristyl methacrylates, cetyl methacrylates, stearyl methacrylates, and the like, aralkyl methacrylates, such as phenylethyl methacrylates, phenylpropyl methacrylates, and the like, and aralkyl methacrylates, in which the aryl group is substituted with alkyl groups, halogen atoms, alkoxy groups, nitro groups, or similar substituents which will not interfere with the polymerization reaction, dialkylaminoalkyl methacrylates, such as dimethylaminoethyl methacrylate, dimethylaminobutyl methacrylates, diethylaminoethyl methacrylates, morpholinoalkyl methacrylates, piperidinoalkyl methacrylates, and the like, alkoxyalkyl, aryloxyalkyl, and aralkoxyalkyl methacrylates, such as methoxyethyl methacrylate, ethoxyethyl methacrylate, butoxyethyl methacrylates, hexyloxypropyl methacrylates, ethoxypropyl methacrylates, propoxybutyl methacrylates, hexyloxyhexyl methacrylates, phenoxyethyl methacrylates, benzyloxyethyl methacrylates, and the like. Bis methacrylate esters of diols, such as the diester of 1,4-butanediol and methacrylic acid, can also be used. Of course, M in Formula II can also represent an ester of methacrylic acid, and Formula II embraces copolymers in which two or more esters of methacrylic acid, with or without additional comonomers, are polymerized according to the process of the invention.

A wide variety of monomers can be copolymerized according to the process of the invention with esters of methacrylic acid, in addition to other esters of methacrylic acid. Among the suitable comonomers are methacrylonitrile, vinyl triethoxy silane, diethyl vinyl phosphonate, methyl crotonate, 2-vinylpyridine, and the like. The copolymerization of two or more different esters of methacrylic acid, or of at least one ester of methacrylic acid with another comonomer provides a useful method of incorporating different kinds of functionality into the polymer molecule. For example, copolymers which incorporate a phosphonate or a silane can be used to provide flame retardancy and glass adhesion promotion, respectively.

As noted above, the polymer compositions of the invention are produced by the anionic polymerization of the suitable monomer or monomers in the presence of an alcohol and an alkoxide catalyst. The final average molecular weight of the polymers produced in the anionic polymerization is a direct function of the overall molar ratio of the alcohol to the monomer. It has been found that two general approaches can be taken to obtain control of polymer molecular weight and molecular weight distribution to produce the polymer compositions of the invention.

In the first approach, which is a one-stage polymerization reaction, the molar ratio of the chair-regulating alcohol to the total monomer charge is maintained at a relatively constant value by addition of the alcohol throughout the polymerization reaction. Generally, it has been found that higher alcohol to monomer ratios will lead to slower polymerization rates and lower average molecular weight polymer compositions, while lower alcohol to monomer ratios will lead to faster polymerization rates and higher average molecular weight polymer compositions. Thus, by manipulating the molar ratio of the total quantity of the alcohol to the total monomer charge, some control of the molecular weight distribution of the polymer compositions of the invention can be obtained. Generally, the molar ratio of the alcohol to the total monomer charge will be from about 1:4 to about 1:50, and preferably from about 1:4 to about 1:25.

Either a batch or a gradual addition process can be employed to obtain the desired alcohol to monomer ratio. In the batch process, alcohol is added, at a rate consistent with the conversion of monomer to polymer, to a suspension or solution of the alkoxide catalyst in a solution of a portion of the total alcohol charge in the entire monomer charge. Generally, in the batch process, the concentration of the alcohol in the reaction mixture is kept relatively constant at about 0.05 to about 5 molar % of the total monomer charge, and preferably at about 0.1 to about 3 molar % of the total monomer charge. In the gradual addition process, both the monomer and the alcohol are gradually added to a suspension or solution of the alkoxide in an inert solvent or in a portion of the total monomer charge. The alcohol and the monomer can be gradually added to the polymerization separately or a solution of the alcohol in the monomer can be added. Generally, in the gradual addition process, the alcohol will be present at a level of about 2 to about 40 molar % of the total monomer charge, and preferably about 5 to about 25 molar % of the total monomer charge. At the conclusion of the addition of the alcohol or of the monomer and alcohol and a short holding period for polymerization to be completed, the alkoxide catalyst is neutralized with a suitable acid, such as a mineral acid or a carboxylic acid, as for example acetic acid, and the resultant salt is removed by filtration or washed from the reaction mixture with water. If a solvent is present, it can be removed by conventional techniques, such as evaporation or distillation under reduced pressure or extrusion.

In the second, and preferred, approach to making the polymer compositions of the invention, the polymers are produced in a two-stage procedure. As in the previous approach, the final average molecular weight is determined by the final ratio of total monomer to alcohol, but a narrower distribution about the average molecular weight can usually be achieved. In the first stage of the polymerization reaction, a polymer having a low molecular weight distribution, for example in which $n$ in Formula I is about 2 to 6, with an average of 3 to 4, is prepared by the batch or gradual addition techniques described above, using about 20 to about 60% by weight of the total monomer charge, and using a relatively high alcohol concentration, generally about 20 to about 50 mole % of the initial monomer charge. The remainder of the monomer charge, generally about 40 to about 80% by weight of the total monomer charge, is then added to the reaction mixture. The addition of the remaining monomer is exothermic and leads to revised molecular weight distribution. This final average molecular weight distribution is determined by the molar ratio of the alcohol to the total monomer charge. The resulting polymer composition can then be worked up and purified as described above.

The rate of polymerization is influenced by many reaction variables, including the type and concentration of catalyst, the reaction temperature, the relative acidity of the chain-regulating alcohol, and particularly by the concentration of the chain-regulating alcohol in the reaction mixture at any given time.

The above polymerization reactions are generally run at a temperature of about 40° to about 130° C., and preferably about 60° to about 95° C. Since the polymerization reaction in these processes is exothermic, temperature control generally is maintained either by reflux or by external cooling. Although no solvent is necessary to carry out these polymerization reactions, a suitable organic solvent which is inert under the reaction conditions, such as toluene, xylene, or the like, can be employed. It may be particularly advantageous under some polymerization conditions to employ a solvent, for example, at about 10 to 20% by weight, in the later stages of the polymerization to maintain a viscosity which is more convenient for handling. The polymerization reaction is generally conducted at atmospheric pressure, although super- or sub-atmospheric pressures may be advantageous under some conditions.

The polymerizations of the invention are catalyzed by alkoxides. A wide variety of alkoxides can be used in the polymerizations of the invention, and generally any alkoxide derived from an alcohol having the formula R"OH, where R" is as defined in Formula III above, can be used. Mainly for economic reasons, simple normal alkoxides such as those of potassium and sodium, and particularly sodium methoxide and potassium methoxide, are preferred as catalysts. Mixtures of alkoxides can also be used. However, by suitable choice of alkoxide, the rate of polymerization can be influenced greatly. The solubility of the alkoxide and the counter ion are factors which must be considered in assessing this influence. A polar organic cosolvent, such as, for example, dimethylformamide or dimethylsulfoxide, can also be used advantageously under some reaction conditions to improve the solubility and consequently the efficiency of the catalyst. Generally, the alkoxide will be present in the reaction mixture at a concentration of about 0.4 to about 4 mole %, and preferably about 0.6 to about 3.0 mole %, based on the total monomer charge.

A wide variety of alcohols can also be used as the chain-regulating agent in the polymerizations of the invention. Generally, the alcohol will have the formula R"OH, where R" is as defined in Formula III above. However, the alcohol used in the polymerizations need not be identical to the alcohols from which the monomer or monomers are derived.

One of the advantages of the polymerization processes of the invention is their minimization of very low molecular weight material, as well as high molecular weight material, in the polymer compositions of the invention. The very low molecular weight material, such as dimers and trimers, detracts from the useful characteristics of the polymer compositions. Not only does the very low molecular weight material represent a diversion of monomer from forming useful polymer, this material can react with intended coreactants in use formulations. Furthermore, when present in plasticizer compositions, low molecular weight polymers lead to volatility problems. Thus, the polymer compositions of the invention are quite useful in applications where significant concentrations of very low molecular weight polymers are to be avoided. Another of the advantages of the present invention is the ease with which the polymers of the invention can be used as precursors to form methacrylic polymers having varied or multiple functionality.

The polymers of the invention having dialkylamino, alkoxy, aryloxy, aralkoxy, or silyl functionality comprise mers having the structure (IV)

wherein Z is a dialkylaminoalkyl group, preferably having up to 6 carbon atoms, an alkoxyalkyl group, preferably having up to 12 carbon atoms, an aryloxyalkyl or aralkoxyalkyl group, preferably having up to 12 carbon atoms, most preferably a phenoxyalkyl, benzyloxyalkyl, substituted phenoxyalkyl, or substituted benzyloxyalkyl group, or an aralkyl group, preferably having up to 10 carbon atoms, most preferably a benzyl or substituted benzyl group. If the polymers contain less than 100% of the functional mers as defined above, they will generally also comprise mers of the structure (V)

wherein Z' is an alkyl group, preferably having 1 to 24 carbon atoms. The functional polymers of the invention are prepared by three major methods — polymerization with a functional monomer or comonomer, polymerization in the presence of a functional alcohol, and post-reaction of a polymer of the invention to introduce the desired functionality.

As discussed above, one convenient method is to use a monomer or comonomer in the polymerization reaction an ester of methacrylic acid or another monomer which itself contains a suitable functional group. Among such monomers are dimethylaminoethyl methacrylate, ethoxyethyl methacrylate, vinyl triethoxy silane, diethyl vinyl phosphonate, methyl crotonate, 2-vinylpyridine, and similar functional monomers.

Another method for preparing polymers containing these functional groups is to carry out the polymerization reaction in the presence of an appropriate functional alcohol. Since facile transesterification between the chain-regulating alcohol and the ester of methacrylic acid can take place during the polymerization reaction, the use of a functional alcohol as the chain-regulating alcohol will use the scrambling between RO and R′O in Formula I to introduce the desired functionality as to the polymer. Among functional alcohols which can be thus employed are dimethylaminoethanol, ethoxyethanol, and the like.

Other derivatives of the polymers of the invention can be conveniently made by post-reactions involving any suitable functional group in the polymer. The various post-reaction techniques, such as transesterification, and the like, are well-known in the polymer art.

The polymer compositions of the invention have a wide variety of uses. They are particularly useful as intermediates in preparing polymers having condensation-crosslinkable functionality. Such functional polymers are described and claimed in our United States patent application Ser. No. 517,337, entitled "Novel Methacrylic Polymers Having Condensation-Crosslinkable Functionality," filed on even date herewith, assigned to a common assignee, and incorporated herein by reference. They are also quite useful in forming films, coatings, such as in paints, lacquers, varnishes, and the like, powder coatings, impregnants, and adhesives for both natural and synthetic materials, such as paper, textiles, wood, brick, stone, ceramics, plastics, metal, and leather as binders for non-woven fabrics, as plasticizers and modifiers for a wide variety of polymer compositions, as melting point depressants, as leveling agents and coalescent aids, and in a wide variety of other uses. The dialkylaminoalkyl-containing polymers of the invention are useful as intermediates, such as in forming water-soluble quaternary salts and reactive derivatives, and as dispersants and leveling aids in acidic systems. The alkylsilylalkyl-containing polymers of the invention are also useful in forming reactive derivatives. Pigments, dyes, fillers, antioxidants, antiozodants, stabiliziers, flow control agents, or other optional ingredients can also be included in polymer compositions of the invention.

When used as coatings, fillers, or adhesives, the polymer compositions of the invention can be applied with or without a solvent by casting permanently or removably onto a suitable substrate. However, one of the advantages of the present invention is that polymer compositions can be prepared which can be applied without the use of any solvents, in either solid or liquid form as 100% solids compositions, or with a solvent in high solids compositions having less than 100% solids. For example, when water or an organic solvent is used, the reactive polymers are advantageously formulated at about 50 to about 100% by weight solids, and preferably greater than about 70% by weight solids. Among the organic solvents which can be used to formulate polymers of the invention and reactive polymer systems incorporating these polymers are hydrocarbons such as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers, such as diethyl ether, the monoethyl ether of ethylene glycol, the monomethyl ether of ethylene glycol, and the monobutyl ether of ethylene glycol; and miscellaneous solvents including dimethylformamide, dimethylacetamide, acetonitrile, nitromethane, nitroethane, nitropropane, and nitrobutane; as well as mixtures of two or more solvent materials listed above. These properties are particularly desirable since minimization or elimination of volatile organic solvents also minimizes or eliminates potential ecological hazards.

Polymers of the invention can also be used in preparing powder coatings. The polymers are isolated, powdered, formulated, applied, and cured by conventional means to produce the desired coatings.

The following examples will further illustrate the invention but are not intended to limit it in any way. All parts are by weight and all temperatures are in degrees Centigrade, unless otherwise noted.

EXAMPLE I

Homopolymerization of Methyl Methacrylate

Method A

This example shows a typical homopolymerization of an ester of methacrylic acid according to the "batchtype" polymerization process of the invention.

A clean, dry 3-neck flask equipped with mechanical stirrer, condenser and a thermometer in a Y-arm side inlet, under dry nitrogen, is charged with commercially pure methyl methacrylate monomer, inhibited with 10 ppm of phenothiazine or dicyclohexyl phenylene diamine. The stirred solution is heated; upon warming to 60° C., it is charged with 0.6 mole % sodium methoxide and 3.0% methanol (added as a 25% by weight solution in methyl alcohol). The cloudy white mixture is heated to 93° C. over a 6-minute period and as the 75°-80° C. temperature is passed, methanol addition in aromatic solvent (xylene, toluene) is started via the side arm inlet at the rate of 0.35 mole % per minute for a period of 33 minutes (to a total of 15 mole % methyl alcohol addition). The gradually thickening and clearing solution is maintained at 93 ± 1° C. with stirring for an additional 2 hours. Xylene or toluene is added as diluent as needed for viscosity control. Analysis of the product solution by gas-liquid chromatography upon completion of the reaction time discloses less than 2% of residual methyl methacrylate and a trace (<0.1%) of methyl alcohol. Dimer and trimer levels are less than 3–4% and less than 8–10% by weight, respectively, as determined by quantitative gas-liquid chromatography and confirmed by gel permeation chromatography. The yellow to yellow-orange mixture is cooled to 60° C., the basic components are quenched with acid (for example, acetic, formic, HCl, $H_2SO_4$) removing essentially all color, and 1% by weight of a suitable filter aid is dispersed and stirred for 5–10 minutes. Pressure or aspirator filtration results in greater than 94% by weight, recovery of a clear, colorless to light straw solution of methyl methacrylate polymer. Analysis by gel permeation chromatography shows symmetrical weight distribution around 700–900 M.W., with greater than 85% by weight in the range of 300–1200. Unsaturation determination with solvent-stripped product typically shows less than 0.07 meg./g.

Similar procedures with differing methanol addition rates at constant catalyst level and 93° C. give the product distribution in Table I.

TABLE I

| Methanol Addition Rate (Mole % Min.) | Total Alcohol Level (Mole % of Methyl Methacrylate Charged) | Product Appearance and Molecular Weight Distribution[1] |
|---|---|---|
| 0.45 | 20 | Oil; 300–900 |
| 0.30 | 12–13 | Syrup[2]; ~ 400–1500 |
| 0.20 | 11 | Semi-Solid; 600–1600 |
| 0.10 | 8–9 | Brittle Solid M.P. > 40° C.; 800–3000 |
| 0.05 | 7 | Brittle Solid M.P. ~ 50–80°; 1000–4000 |
| None | 3 | Brittle Solid M.P. 50–80°; 1000–10,000 |

[1]greater than 85% of the product weight contained in the limits specified; by gel permeation chromatography.
[2]At 80% by weight in solvent.

Method B

This example shows a typical homopolymerization of an ester of methacrylic acid according to a gradual addition polymerization process of the invention.

To the apparatus described in Method A is charged 1.0 to 1.2 mole % (based on monomer to be subsequently added) of powdered potassium tert-butoxide or methoxide to enough toluene or xylene diluent to form a stirrable slurry. A solution of methyl methacrylate containing 15 mole % methanol, neat or about 10% by weight of toluene or xylene for viscosity control, is added dropwise to the stirred catalyst slurry at 65° C., at a rate sufficient to maintain reaction (added at 1.3–1.5% per minute for the first half of addition and about 1.0% per minute for the second half). The mixture readily takes on a pale yellow color and the viscosity noticeably increases after several percent of the monomer solution is added. Aliquots taken during and following monomer/alcohol addition establish that high conversion polymerization, with molecular weight distribution essentially constant, occurs throughout the addition period, that less than 10% residual monomer remains at the completion of addition. A short holding time at 65° C. reduces monomer levels to about 2%.

Following a 20 to 30 minute hold, the nearly clear, yellow oil is cooled to 60° C., quenched with 1.0–1.2% acetic acid (removing almost all color), treated with 1% by weight of a filter aid and vacuum or pressure filtered at 60 to 80° C. Gel permeation chromatography of the clear, colorless to light straw colored oil discloses the major weight fraction to be about 1200, with 90% by weight spread between 300 and 2600. Lower methanol levels yield successively higher molecular weight products of somewhat broader molecular weight distribution (See Table II).

TABLE II

| Methyl Methacrylate Polymerization, Gradual Addition Process at 65° C. | |
|---|---|
| Methanol Level | Product Mw (and 90 wt. % distribution) |
| 20% | 1100–1200 (300–2500) |
| 16 | 1200 (300–2600) |
| 12 | 1600–1700 (350–3500) |
| 10 | 1800 (350–4000) |

Method C

This example shows a typical homopolymerization of an ester of methacrylic acid according to the two-stage polymerization process of the invention.

To the apparatus described in Method A is charged 2.24 g. (20 mmole, 1.0 mole % based on total monomer) of powdered potassium tert-butoxide (or an equivalent charge of potassium methoxide) and about 10 g. xylene to form a stirrable slurry. Monomer solution (a) is prepared with 80 g. (0.80 mole, 40% of total monomer) methyl methacrylate, inhibited with 3 ppm dicyclohexyl phenylenediamine, and 9.6 g. (0.30 mole, 37.5 mole % of the initial methyl methacrylate charge, 15% of total monomer charge) anhydrous methanol; solution (a) is added over a 30 to 45 minute period to the stirred catalyst slurry at 60 to 65° C. The exotherm observed during the early stages of addition subsides and reaction temperature is maintained throughout addition and for a 45 minute post-addition hold. The reaction mixture is a mobile, hazy orange-yellow liquid containing 5–10% of free methyl methacrylate and 90–95% as dimer through hexamer ($n$ = 2–6).

Monomer solution (b), consisting of 120 g. (1.20 mole, 60% of total monomer charge)methyl methacrylate and 25 g. xylene, is added dropwise over a 1 hour period at 60°–65° C. Exotherm occurs throughout this addition; gas-liquid chromatography of reaction aliquots discloses monomer levels at less than 1% and gel permeation chromatography indicates polymer growth paralleling addition. After the addition of solution (b), the hazy orange syrup (viscosity about 300 cps at 65°) is held a this temperature for 15 minutes, reducing methyl methacrylate level to essentially nil, and the catalyst is then quenched with 1.2 g. (20 mole) acetic acid. One gram of a filter aid is added to the nearly colorless syrup and dispersed with stirring for 5 to 10 minutes.

Vacuum or pressure filtration of the warm oil through warm funnel affords the product as a clear, light straw to colorless syrup in greater than 98% recovery. Gel permeation chromatography discloses Mw approximately 720–750, with the distribution 300–1300.

When a total of 20 mole % methanol is used in the above procedure, polymer is obtained in greater than 95% yield with Mw about 620, spread from 250 to 1100.

In general, potassium n-alkoxides are preferred. Preparations made solely with initially soluble sodium methoxide as the catalyst are also successful, but require approximately b 4 to 5-fold longer reaction times for 95% conversion at 90°–93° C. Gel permeation chromatography discloses a similar Mw, at 750–800 with a slightly broader distribution, 300 to 1600. Mixtures of potassium and sodium alkoxides can be used as catalyst to optimize the polymerization efficiency under different reaction conditions. While each of the above three methods can be used to prepare polymers of the invention, Method A and Method C are generally preferred since they yield polymeric products having narrower molecular weight distribution.

EXAMPLES 2 to 27

Preparation of Methacrylate Hompolymers and Copolymers

Following the procedures of Example 1, a wide variety of methacrylate homopolymers and copolymers are prepared. Table III summarizes the polymerization conditions and properties of some typical methacrylate polymers of the invention.

TABLE III

Methacrylate Homo- and Co-Polymers

| Ex. | Monomer(s)[1] | Method[2] | Conversion[3] (Hours) | Alcohol Level[4] | Product Mw[5] | Chain Length[7] |
|---|---|---|---|---|---|---|
| 2 | MMA | A (93°) | 97.3% (2.5) | 18% (0.35) | 700 (300–1100)[6] | 6–7 (3–11) |
| 3 | MMA | A (93°) | 97 (2.5) | 15 (0.3) | 750 (300–1600)[6] (80%, 400–1300) | 7 (3–16) |
| 4 | MMA | A (93°) | 97 (2.0) | 8 (0.1) | 1600 (500–2500) | ~16 (5–25) |
| 5 | MMA | B (65°) | 96 (1.5) | 12 | 1600 (400–3300) (80%, 430–2500) | ~16 (4–33) |
| 6 | MMA | B (80°) | 96 (2)[8] | 16 | 1200 (300–2400)[6] | ~12 (3–24) |
| 7 | MMA | B (100°) | >90 (5–6) | 15 | 1600 (400–2500) | 16 (4–25) |
| 8 | MMA | C (65°) | 99% (2)[8] | 15 | 750 (300–1600) (80%, 430–1300) | 7–8 (3–16) |
| 9 | MMA | C (65°) | 95 (ca. 4)[8] | 20 | 620 (250–1100)[6] | 6 (2.3–11) |
| 10 | MMA | C (93°) | >90 (6)[9] | 15 | 800 (300–1600)[6] | 7–8 (3–16) |
| 11 | BMA | A (98°) | 95 (3) | 11 (0.2) | 1400 (400–3200) | ~10 (3–23) |
| 12 | BMA | B (80°) | 96 (2.2)[8] | 12 | 2400 (400–6000) | 16–17 (3–40) |
| 13 | BMA | B (80°) | 96 (2.2)[8] | 15 | 1600 (400–5800) | 11 (4–40) |
| 14 | EMA | B (75°) | 96 (2.5)[8] | 15 | 1600 (350–6500) (80%, 450–5200) | 14 (3–60) |
| 15 | DMAEMA | A (67°) | 97 (2.5)[10] | 18 (0.2) | 1000 (300–2500)[6] | 6–7 (2–16) |
| 16 | DMAEMA | B (80°) | 98 (2.5)[8] | 10 | 1200 (300–3500)[6] | ~7 (2–22) |
| 17 | BMA | C (80°) | 99 (4)[8] | 15 | 1000 (350–2200) | 6–7 (3–15) |
| 18 | 80 MMA/20 BMA | A (93°) | 96 (2.5) | 15 (0.35) | 1000 (350–1800)[6] | 9 (3–16) |
| 19 | 50 MMA/50 BMA | A (93°) | 95 (3.0) | 11 (0.2) | 1100 (400–2200) | 9–10 (4–18) |
| 20 | 50 MMA/50 DMAEMA | A (67°) | 96 (2) | 8[11] (0.1) | — | — |
| 21 | 72 MMA/28 DMAEMA | B (67°) | 95 (2)[8] | 12 | 1300 (300–2500)[6] | ~11 (3–21) |
| 22 | 77 MMA/23 LMA | A (93°) | 95 (2) | 13 (0.3) | 1100 (400–2500) | 8 (2–18) |
| 23 | 75 MMA/25 i-BMA | B (95°) | 80 (incomp. at 4) | 5 | 1400 (400–3000) | 13 (4–27) |
| 24 | 50 MMA/50 i-BoMA | B (95°) | 93 (5) | 7 | — | — |
| 25 | 80 MMA/20 MAN | A (93°)[12] | 90 (3) | 8.5 (<0.1) | est. 2000 | est. >15 |
| 26 | 70 BMA/30 MAN | B (75°) | 83 (2½) | 10 | 1400 (400–3000) | 11 (3–25) |
| 27 | MMA/(DMAEMA)[11] | B (70°) | 97 | 15[11] | 800 (350–1800) | 7–8 (3–16) |

TABLE III-continued

| Ex. | Monomer(s)[1] | Method[2] | Methacrylate Homo- and Co-Polymers Conversion[3] (Hours) | Alcohol Level[4] | Product Mw[5] | Chain Length[7] |
| --- | --- | --- | --- | --- | --- | --- |
| | | | (2) | | | |

Additional Notes:

[1]The following abbreviations are used: MMA = methyl methacrylate; EMA = ethyl methacrylate; BMA = butyl methacrylate; DMAEMA = dimethylaminoethyl methacrylate; LMA = lauryl methacrylate; i-BMA = isobutyl methacrylate; i-BoMA = isobornyl methacrylate; MNA = methacrylonitrile.

[2]A = Method A in Example 1; B = Method B in Example 1; C = Method C in Example 1; reaction temperature in ° C. in parentheses.

[3]Conversion determined by residual monomer via gas liquid chromatography; catalyst is 0.6 mole % NaOCH$_3$ in 3.0 mole % methanol unless otherwise noted.

[4]Method B, mole % alcohol on monomer; Method A, total mole % alcohol on monomer (added at the indicated mole %/min.); Method C, on total monomer, added in first stage.

[5]Weight average molecular weight ($\overline{M}w$) as determined by standardized gel permeation chromatography, based on methyl methacrylate polymer calibration (>90 wt. % included in the M.W. distribution listed parenthetically); 80% distribution given in several typical examples.

[6]The lower $\overline{M}w$ polymers (i.e. those of $\overline{M}w$ less than 1300) contain about 4–8% by weight of polymer molecules under M.W. 400.

[7]Determined as in footnote 5; represents n in Formula I or (n' + n'') in Formula II.

[8]The catalyst is 1.0–1.5 mole % powdered potassium t-butoxide or potassium methoxide.

[9]Sodium methoxide catalyst in methanol; reaction terminated before complete conversion.

[10]1.0% KOCH$_2$CH$_2$NMe$_2$ catalyst in methanol/dimethylaminoethanol.

[11]Dimethylaminoethanol used as alcohol.

[12]MAN added slowly to MMA/catalyst/ /MeOH mixture at reaction temperature.

EXAMPLE 28

Automotive Lacquer Formulation

Formulation of an automotive exterior lacquer with superior properties is described, employing low molecular weight methyl methacrylate polymers as described in this invention as plasticizers.

A mixture of 50 parts TiO$_2$, 16.6 parts high molecular weight (>100,000 poly(methyl methacrylate) at 30% solids, 33.4 parts ketone/aromatic solvent and 100 parts sand is milled for 15 minutes and filtered. Sixty parts of this pigmented grind are combined with 154 parts high molecular weight poly(methyl methacrylate) at 30% solids, 27.5 parts at 76% solids of the low molecular weight polymeric methyl methacrylate of Example 8 and 241 parts solvent. The resulting lacquer at 21% solids content (viscosity: 11 No. 4 Ford Cup), is applied to metal panels by conventional spray methods and baked dry. The resulting coating exhibits gloss, low temperature melt flow, hardness, weatherability, salt spray resistance, and cold crack resistance superior to unplasticized controls and to materials containing conventional plasticizers.

Similar advantageous properties are obtained with the above plasticizer and other homo- and copolymers of Examples 1 to 27 in other high molecular weight copolymers such as BMA/MMA, IBMA/MMA, and the like.

EXAMPLE 29

Nonaqueous Dispersion

This example shows the formulation of a representative nonaqueous dispersion, employing the low molecular weight polymers of the invention, and the use of the polymer compositions of the invention as pigment dispersants.

A mixture of 50 parts TiO$_2$, 13.2 parts at 76% solids of the polymer of Example 8, 36.8 parts of 2/1 Pine Oil/Texanol, 0.5 parts of a conventional dispersant, such as that available commercially as Troykyd 98-C, and sand are milled 15 minutes and filtered. The lacquer blend is let down under agitation in the following order: 50 parts of the filtered grind, 24 parts at 76% solids of the polymer of Example 8, 5.6 parts of 2/1 Pine Oil/Texanol, 38 parts of 3/1 naptha/pine oil and 97.5 parts of high molecular weight methyl methacrylate dispersion polymer at 54% solids. The resulting lacquer at 47% solids content is applied to metal panels by conventional spray methods and baked dry. The resulting coatings give similar or superior properties when compared to the plasticized controls and formulations prepared with conventional nonaqueous dispersants.

When other homo- and copolymers of Examples 1 to 27 are used in formulating nonaqueous dispersions, similar advantageous properties are obtained.

The following example shows a typical use of the polymers of the invention as precursors for condensationcrosslinkable polymers.

EXAMPLE 30

Polyol Formation from Low Molecular Weight Methyl Methacrylate Polymer and 1,3-Butylene Glycol Transesterification of 155 g. of a methyl methacrylate polymer prepared according to Example 1, having a Mn of 450, with 153 g. (1.7 moles) 1,3-butylene glycol in the presence of 7 g. (62 mmole, 3.6 eq. %) potassium tertbutoxide at 100° C., employing a slow nitrogen sparge, yielded 22 g. of distillate in 15.5 hours. Another 2.3 g. distillate resulted after 19 hours at 130° C. following by 0.8 distillate after 7 hours at 160° C. The reaction was completed at 200° C. for 16 hours yielding a total of 36 g. distillate. The catalyst was quenched with methanolic HCl; excess methanol and butylene glycol were distilled in vacuo at 150° C./7 mm., ending with a nitrogen sparge. The cooled product was taken up in toluene, treated with filter aid and filtered warm. Removal of toluene in vacuo yielded 205 g. of a clear, light solid with hydroxyl no. 190 and an Mn of 825 (by ebulliometry).

EXAMPLE 31

Plasticizers and Melt Depressants in Powder Coatings

Solutions of high molecular weight acrylic (co-)-polymers, polystyrenes, and the like and 15 to 40% by weight of appropriate, compatible polymers of the invention are dried, by vacuum stripping, extrusion, or similar technique, milled to fine powders, deposited as powder films on metal substrates and baked at 250° to 375° F., resulting in smooth films of high gloss.

The following table summarizes the properties of two of these compositions.

The polymers employed are a copolymer of methyl methacrylate and ethyl acrylate having a molecular weight of greater than 50,000 (designated composition A in the table) and a homopolymer of methyl methacrylate having a molecular weight of greater than 100,000 (designated as composition B in the table). The methyl methacrylate polymer of Example 8 is used as the plasticizer for both compositions. The following results are obtained:

| Polymer | Plasticizer (wt. %) | 250° F | 300° F | Melt Flow[1] 325° F | 350° F | 375° F |
|---|---|---|---|---|---|---|
| A | 0 | 3 | 4–5 | 5+ | 6 | 6 |
| A | 25 | 5 | 6 | 6 | 6 | 6 |
| B | 0 | 1 | 2 | — | 4 | 4–5 |
| B | 30 | 1–2 | 3 | — | 5+ | 6 |

[1]Rating: 1-no change; 2,3-partial sintering; 4-sintering but no flow; 5-partial flow out; 6-good flow and high gloss.

The above data shows the improved melt flow properties of polymer compositions containing as plasticizers polymers of the invention in powder coating applications.

When other polymers of the invention are substituted in these formulations, useful powder coating compositions are obtained.

EXAMPLE 32

Copolymerization of Methyl Methacrylate and Vinyltriethyoxysilane

A 300 ml., 3-necked flask equipped with thermometer, stirrer, reflux condenser, dry nitrogen blanket and heating mantle, is charged with: 1.55 g. (10 mmole potassium methoxide, 26 mmole methanol) of 45 wt. % potassium methoxide in methanol.

With rapid application of heat to the flask, a solution of 40 g. (0.40 mole) methyl methacrylate, and 19 g. (0.10 mole) vinyl triethoxysilane, is added dropwise during 20 minutes as reaction temperature is moderated at 90 to 100° C. with heating and air cooling as required.

The mixture attains a yellow to orange red color upon addition and viscosity noticeably increases. Analysis of reaction samples taken at 20%, 50% and 85% monomer addition levels disclosed that both monomers are essentially completely consumed as they are added. A small (0.3g) catalyst charge is made after monomer addition is completed, a short holding period results in greater than 98% conversion of both monomers. Toluene (10 g.) is added to moderate viscosity during addition and after conversion is complete (10 g.).

The red, slightly hazy viscous oil is neutralized with acetic acid and filtered, giving a clear, pale yellow syrup with the following properties:

Solids — 74% in toluene
Volatiles other than toluene: less than 2 wt. %.
Viscosity (25° C.): about 3,000 cps.

A portion of the oil is stripped free of solvent at 80° C./5 mm Hg. to leave a semi-solid, clear resins. Analysis for unsaturation by mercuric ion catalyzed bromination discloses 1.0 to 1.1 meq. unsaturation per gram. Ebulliometric number average molecular weight ($M_n$) in benzene is 855±10.

When other alkyl esters of methacrylic acid are used in the above polymerization reaction, similar silane containing copolymers are prepared.

It is to be understood that changes and variations may be made without departing from the spirit and scope of the invention as defined by the appended claims.

We claim:

1. An anionically-polymerized addition homopolymer or copolymer of at least one ester of methacrylic acid selected from the group consisting of ($C_1$-$C_{24}$) alkyl esters of methacrylic acid, di($C_1$-$C_4$) alkylamino ($C_2$-$C_4$) alkyl esters of methacrylic acid, ($C_2$-$C_{12}$) alkoxyalkyl esters of methacrylic acid, ($C_7$-$C_{12}$) aryloxyalkyl esters of methacrylic acid, ($C_7$-$C_{12}$) aralkoxyalkyl esters of methacrylic acid, and ($C_7$-$C_{10}$) aralkyl esters of methacrylic acid, and, in a copolymer, other anionically copolymerizable monomers, wherein $n$, the average chain length of the homopolymer or copolymer, is about 6 to 50 mers; the polymerization being carried out, in the presence of an alcohol and a catalytic amount of an alkoxide, using controlled rates of addition of at least one of the ester, the alcohol and the alkoxide.

2. The polymer of claim 1 wherein at least about 85% by weight of the molecules of the polymer have chain lengths of about $\sqrt{2\bar{n}}$ to about $2\bar{n}$ mers.

3. The polymer of claim 2 wherein the average chain length is about 6 to about 25 mers.

4. The polymer of claim 2 wherein the polymer is a homopolymer of an ester of methacrylic acid.

5. The polymer of claim 4 wherein the ester is a ($C_1$-$C_{24}$)alkyl methacrylate.

6. The polymer of claim 5 wherein the ester is a ($C_1$-$C_4$)alkyl methacrylate.

7. The polymer of claim 5 wherein the ester is methyl methacrylate.

8. The polymer of claim 4 wherein the ester is dimethylaminoethyl methacrylate.

9. The polymer of claim 2 wherein the polymer is a copolymer of at least two ($C_1$-$C_{24}$)alkyl; methacrylates.

10. The polymer of claim 2 wherein the polymer is a copolymer of at least one ($C_1$-$C_{24}$)alkyl methacrylate and at least one other copolymerizable ethyleneically-unsaturated monomer.

11. The polymer of claim 10 wherein the copolymerizable monomer is methacrylonitrile, vinyltriethoxysilane, or dimethylaminoethyl methacrylate.

12. The polymer of claim 11 wherein the alkyl methacrylate is a ($C_1$-$C_4$)alkyl methacrylate.

13. The polymer of claim 12 wherein the alkyl methacrylate is methyl methacrylate.

14. The polymer of claim 2 wherein the polymer comprises mers having the structure wherein R is a di($C_1$-$C_4$)alkylamino($C_2$-$C_4$)alkyl group, an alkoxyalkyl group having up to 8 carbon atoms, an aryloxyalkyl or aralkyloxy group having up to 10 carbon atoms, or an aralkyl group having up to 10 carbon atoms.

15. The polymer of claim 14 wherein the polymer also comprises mers of the structure wherein $R^1$ is a $(C_1-C_{24})$alkyl group.

16. In a process for preparing polymers of esters of methacrylic acid, the improvement which comprises carrying out the polymerization in the presence of an alcohol and a catalytic amount of an alkoxide, using controlled rates of addition of at least one of the ester, the alcohol and the alkoxide; producing a polymer wherein $\bar{n}$, the average chain length of the polymer is about 6 to 50 mers.

17. The process of claim 16 in which at least about 85% by weight of the molecules of the polymer have chain lengths of about $\sqrt{2\bar{n}}$ to about $2\bar{n}$ mers.

18. The polymer of claim 2 represented by the formula wherein
R″O represents the residue of the chain-regulating alcohol used in the polymerization reaction;
R′O represents the alcohol portion of an ester of methacrylic acid;
M represents the interspersed residue of the comonomer or comonomers; and
$n'$ and $n''$ are integers of one or more, wherein the sum of $n'$ and $n''$ is 3 to 90.

* * * * *